United States Patent [19]

Ishika

[11] Patent Number: 5,153,864
[45] Date of Patent: Oct. 6, 1992

[54] FOCUSING DETECTION OPTICAL PATH FOR AN OPTICAL INFORMATION PROCESSING SYSTEM

[75] Inventor: Sou Ishika, Kawasaki, Japan

[73] Assignee: Kabushiki Kaisha Toshiba, Kawasaki, Japan

[21] Appl. No.: 500,943

[22] Filed: Mar. 29, 1990

[30] Foreign Application Priority Data

Mar. 31, 1989 [JP] Japan ................................. 1-83610
Mar. 31, 1989 [JP] Japan ................................. 1-83611

[51] Int. Cl.$^5$ ................................................ G11B 7/00
[52] U.S. Cl. ........................... 369/44.23; 369/44.24; 369/110
[58] Field of Search ............... 367/44.23, 44.24, 44.44, 367/44.42, 112; 369/110, 100, 44.11, 44.14; 250/201.5

[56] References Cited

U.S. PATENT DOCUMENTS

| 4,712,205 | 12/1987 | Smid et al. | 369/112 |
| 4,764,912 | 8/1988 | Ando et al. | 369/44.42 |
| 4,900,910 | 2/1990 | Doi | 369/44.23 |

FOREIGN PATENT DOCUMENTS

| 0177108 | 4/1986 | European Pat. Off. | |
| 0260569 | 3/1988 | European Pat. Off. | |
| 0316866 | 5/1989 | European Pat. Off. | |
| 0157852 | 9/1984 | Japan | 369/44.24 |
| 0139935 | 6/1986 | Japan | 369/44.23 |
| 0139937 | 6/1986 | Japan | 369/44.23 |
| 0007332 | 1/1989 | Japan | 369/44.73 |
| 0007334 | 1/1989 | Japan | 369/44.23 |

OTHER PUBLICATIONS

Patent Abstract of Japan, vol. 13, No. 19, Jan. 18, 1989.
Patent Abstract of Japan, vol. 5, No. 60, Apr. 23, 1981.
Patent Abstract of Japan, vol. 10, No. 312, Oct. 23, 1986.
Patent Abstract of Japan, vol. 12, No. 225, Jun. 28, 1988.

Primary Examiner—Roy N. Envall, Jr.
Assistant Examiner—Thang V. Tran
Attorney, Agent, or Firm—Finnegan, Henderson, Farabow, Garrett and Dunner

[57] ABSTRACT

In an optical system, a light beam is converged on an optical disk and the light beam reflected from the optical disk passes through the objective lens and guided to a convex lens made of a refractive material having a first relatively large refractive index. The light beam is converged by the convex lens and divided by a half prism into a transmitted light beam and a reflected light beam. The reflected light beam is detected by a photodetector and converted into a tracking signal. The transmitted light beam is guided to a concave lens made of a refractive material having a second refractive index smaller than the first refractive index so that a divergent power is applied to the transmitted light beam from the concave lens. The converged light beam from the concave lens is detected by a photodetector and converted into a focusing signal. The objective lens is controlled in accordance with the focusing and tracking signals so that the objective lens is maintained in focusing and tracking states.

18 Claims, 11 Drawing Sheets

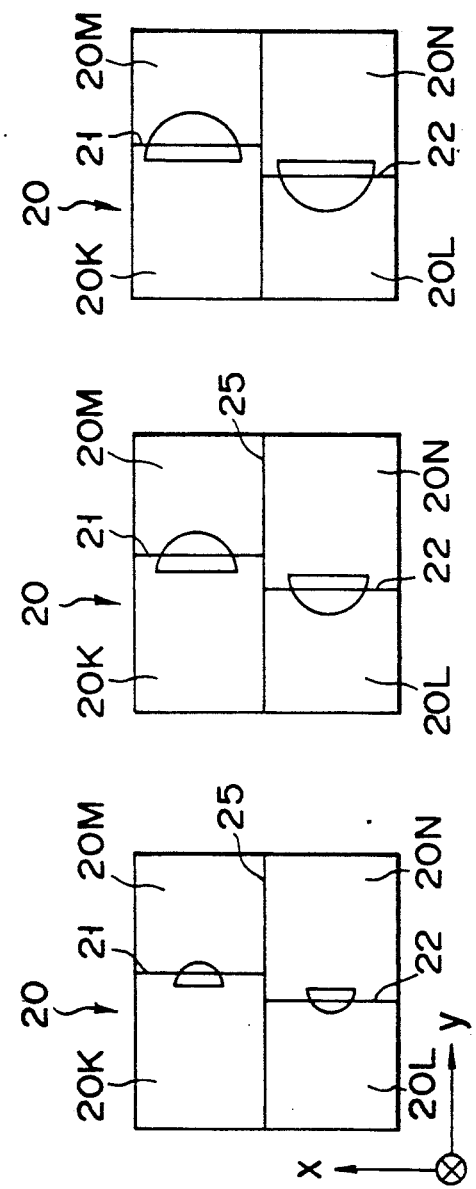

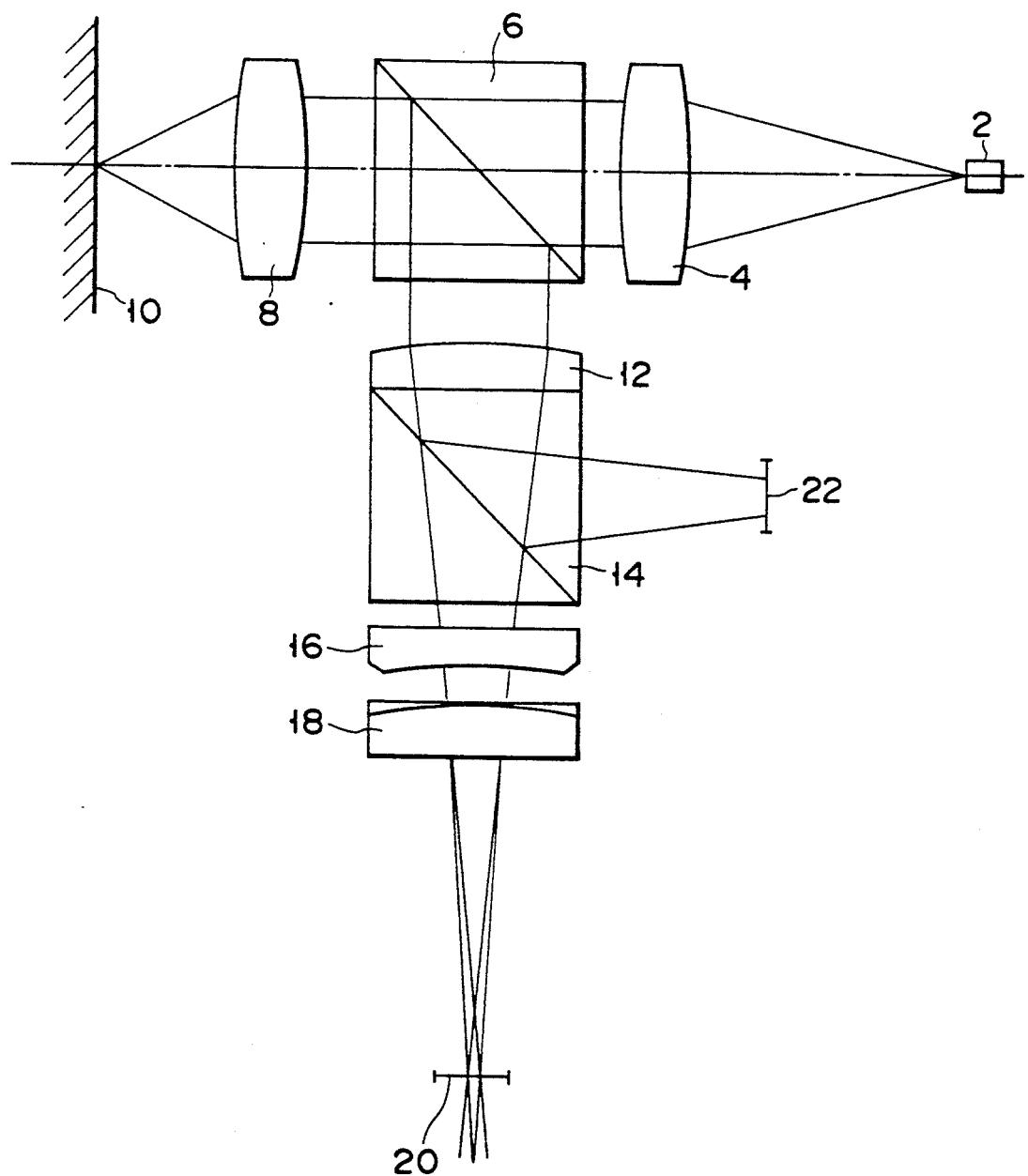
F I G. 7B

FOCUSING DETECTION OPTICAL PATH FOR AN OPTICAL INFORMATION PROCESSING SYSTEM

BACKGROUND OF THE INVENTION

1. Field of the Invention

The present invention relates to an optical information processing system and, more particularly, to an improvement in an optical system of an optical head assembled in an optical information processing system.

2. Description of the Related Art

In an optical information processing system, e.g., an optical filing apparatus, an optical head is used to record information in an optical information recording medium, i.e., an optical disk, and to reproduce the information therefrom. In such an optical head, a light beam emitted from a laser diode serving as a light source is focused on the optical disk by an objective lens in the optical head, and the light beam reflected by the optical disk is guided to the detector. This beam is detected, and is converted into a retrieve signal. In a reproducing-/recording operation of information from/in such an optical disk, the objective lens is maintained in an in-focus state, and a beam waist, i.e., a minimum beam spot, of the light beam is formed on the optical disk. In addition, the objective lens is maintained in an in-track state, and a tracking guide formed on the optical disk is traced by the light beam. Information is accurately recorded in or reproduced from the optical disk. Among methods of detecting such an in-focus or in-track state, a knife-edge method, an astigmatism method, and a push-pull method are conventionally known. In the knife-edge method, a light beam returned from the optical disk is partially extracted by a knife edge arranged on an optical path, and the extracted beam is projected on a focusing detection photodetector through a focusing detection optical system. In this knife-edge method, since a light beam spot formed on a photodetector to detect a focal point is displaced in accordance with a focusing state of the objective lens, the focusing state of the objective lens can be detected. In the astigmatism method, an astigmatism is applied to the light beam returned from the optical disk by the astigmatism lens of the focusing detection optical system arranged on the optical path, and the obtained light beam is projected on the focusing detection photodetector. In this astigmatism method, the shape of a light beam spot formed on the focusing detection photodetector is changed in accordance with a focusing state of the objective lens to detect the focusing state of the objective lens. In the push-pull method, a light beam is diffracted on and returned to the optical disk by the tracking guide, and the returned light beam is projected on a tracking guide detection photodetector. In this push-pull method, an image or a diffraction pattern of a tracking guide is formed in the beam spot detected on the tracking guide detection photodetector as a dark portion. Therefore, when the position of the dark portion is detected, a tracking state of the objective lens can be detected.

In the optical system of the optical head, the larger the focal length of the focusing detection optical system is, the more the detection sensitivity is improved. On the contrary, the larger the focal length of the focusing detection optical system is, the larger the size of the optical head. When the size of the optical head is increased, not only the size of the apparatus itself but also a load of a drive mechanism for the optical head are increased, and it is difficult to access information at high speed. In addition, if a convex lens having a large curvature is assembled in the focusing detection optical system in order to achieve a compact apparatus, the convex lens applies a spherical aberration to the focusing detection light beam, and it is difficult to achieve accurate focusing detection.

The present inventors have already proposed an optical system associated with a so-called twin plate method which is different from the above-mentioned focusing detection system in U.S. Ser. No. 271,827, Ishika filed Nov. 16, 1988 (corresponding EPC application No. 88119021.9, filed Nov. 15, 1988 ). In this optical system, similarly, the larger the focal length of the focusing detection system optical system is, the further the detection sensitivity is improved. On the contrary, the larger the focal length of the focusing detection optical system is, the larger the size of the optical head, and a demand has arisen for improving the conventional system.

SUMMARY OF THE INVENTION

The present invention has bean made in consideration of the above situation, and has as its object to provide a compact optical head having a high focusing detection sensitivity.

According to one aspect of the present invention, there is provided an optical information processing system comprising:

converging means for converging a light beam onto a recording medium having a track;

a convex lens for converging the light beam from the recording medium, which has a relative large first refractive index;

dividing means for dividing the converged light beam from the convex lens into a reflected light beam and a transmitted light beam;

tracing means for generating a tracking signal in response to one light beam divided by the dividing means, and causing the convergent light beam to trace the track of the recording medium in response to the tracking signal;

a concave lens, arranged on an optical path of the other light beam divided by the dividing means, for applying a divergent power to the other light beam, the convex lens having a second refractive index smaller than the first refractive index of the convex lens; and focusing means for generating a focusing signal in response to the other light beam converged by a composite lens system consisting of the convex and concave lenses, and maintaining the converging means in an infocus state in response to the focusing signal.

According to another aspect of the present invention, there is provided an optical information processing system comprising:

converging means for converging a light beam onto a recording medium having a track;

a convex lens for converging the light beam from the recording medium, which has a first refractive index;

dividing means for dividing the converged light beam from the convex lens into a reflected light beam and a transmitted light beam;

tracing means for generating a tracking signal in response to the reflected light beam divided by the dividing means, and causing the convergent light beam to trace the track of the recording medium in response to the tracking signal;

a concave lens, arranged on an optical path of the transmitted light beam divided by the dividing means, for applying a divergent power to the transmitted light beam, the convex lens having a second refractive index smaller than the first refractive index of the convex lens; and focusing means for generating a focusing signal in response to the light beam converted by a composite lens system consisting of the convex and concave lenses, and maintaining the converging means in an in-focus state in response to the focusing signal.

In the information processing system according to the present invention, a convex lens having a large refractive index constitutes a tracking detection optical system. Therefore, the total length of the tracking detection optical system can be decreased, thus realizing a compact optical system. Since a focusing detection optical system is constituted by a composite lens consisting of a convex lens having a large refractive index and a concave lens having a refractive index smaller than that of the convex lens, the focal length of the focusing detection optical system can be increased, thus improving the focusing detection sensitivity. In addition, since the convex lens is made of a material having a large refractive index, the curvature of this convex lens can be decreased, and an astigmatism applied to a light beam which passes through the convex lens can be minimized. Furthermore, the concave lens combined with this convex lens is made of a material having a refractive index smaller than that of the convex lens. Therefore, the curvature of the concave lens can be increased. Even if an astigmatism is applied to the light beam by the convex lens, the concave lens can sufficiently correct the astigmatism. Moreover, in an apparatus employing an optical system in which focusing is detected by a transmitted light beam, and a tracking guide is detected by a reflected light beam, the allowance of misalignment of the optical system can be set to a relatively large value.

BRIEF DESCRIPTION OF THE DRAWINGS

FIGS. 4A, 4B, and 4C are plan views showing a detector shown in FIG. 1;

FIGS. 7A, 7B, 8A, and 8B are schematic views showing an optical system of an optical head according to another embodiment of the present invention.

DETAILED DESCRIPTION OF THE PREFERRED EMBODIMENTS

Figure 1:
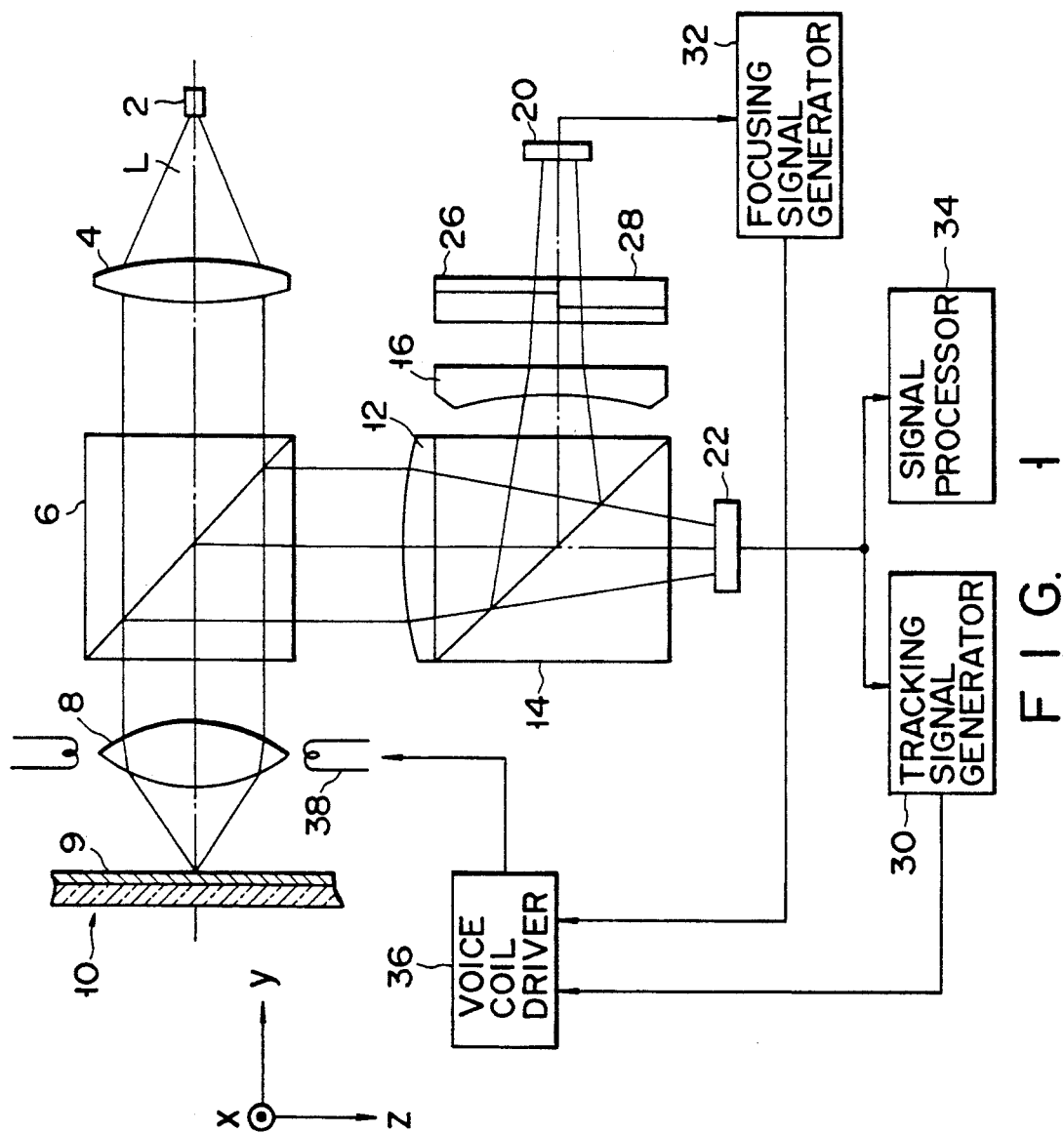
FIG. 1 shows an optical system, employing a twin plates method as a so-called focusing detection method, according to an embodiment of the present invention.

FIG. 1 schematically shows an optical system of an optical head which employs an astigmatism method according to an embodiment of the present invention. As shown in FIG. 1, in the optical head according to the present invention, a laser beam, i.e., a light beam L, emitted from a laser diode 2 serving as a light source is diverged, and is incident on and collimated by a collimator lens 4. The collimated light beam L is incident on an objective lens 8 through a beam splitter 6. The light beam incident on the objective lens 8 is converged on an optical disk 10 having a tracking guide 9 by the objective lens 8. When the objective lens 8 is set in an in-focus state, a beam waist, i.e., a minimum beam spot, of the light beam is formed on the optical disk 10. When the objective lens 8 is set in a out-of-focus state, a beam spot larger than the minimum beam spot is formed on the optical disk 10. In addition, when the objective lens 10 is kept in an in-track state, the convergent light beam from the objective lens 8 is projected on substantially the central portion of the tracking guide, and the tracking guide 9 is traced by this light beam. In contrast to this, when the objective lens 8 is kept in an off-track state, the convergent light beam is illuminated onto the optical disk 10 while being deviated from substantially the central portion of the tracking guide 9, and proper tracing of the tracking guide 9 cannot be achieved.

The divergent light beam reflected from the optical disk 10 is incident and converged on the objective lens 8 again. In the optical system shown in FIG. 1, this light beam is converted into parallel beams by the objective lens 8 upon focusing. The light beam subjected to a converging function in the objective lens 8 is reflected by the beam splitter 6. The reflected beam is incident and converged on a convex lens 12 attached to a light incident surface of a half prism 14. This convergent light beam is divided into two beams by the half prism 14. One light beam is reflected by the half prism 14 as a focusing detection light beam, and is incident on a concave lens 16. This beam is diverged by the concave lens 16, and is incident on a focusing detector 20 through twin plates 26 and 28. In contrast to this, the other light beam divided by the half prism 14 is transmitted through the half prism 14 as a tracking guide detection light beam, and is incident on a tracking photodetector 22.

In the optical system shown in FIG. 1, since the convex and concave lenses 12 and 16 are assembled in the focusing detection optical system including the twin plates 26 and 28, this focusing detection optical system has a large focal length. Since the tracking guide detection optical system is constituted by only the lens 12, this tracking guide detection optical system has a small focal length. In addition, in this embodiment of the present invention, the convex lens 12 is made of glass having a relatively larger refractive index, e.g., 1.7 or more, to obtain a high lens power. The concave lens 16 is made of glass having a relatively low refractive index, e.g., 1.6 or less, to obtain a low lens power.

The light beam which passes through the beam splitter 6 is, therefore, strongly converged by the convex lens 12. The tracking light beam which passes through the half prism 14 is focused within a short distance, and this beam is projected on the tracking photodetector 22. An image or pattern of the tracking guide 9 is formed on the light beam spot formed on the tracking guide photodetector 22. As is known well as a push-pull method, the position of the image or pattern is detected by the detector 22. The detected image is processed by a tracking signal generator 30, and is output as a tracking signal. The focusing detection light beam strongly converged by the convex lens 12 and reflected by the half prism 14 is slightly diverged by the concave lens 16. However, this light beam is strongly converged by the convex lens 12, and hence the convergence of this beam is maintained. This convergent light beam is incident on the twin plates 26 and 28, and is divided into two beams. The divided light beams are projected on the focusing detector 20, and light beam spots are formed on the detector 20. Signals depending on the positions of these light beam spots are output from the detector 20. These signals are processed by the focusing signal generator 32 and generated as a focusing signal.

In addition, the signal from the detector 22 is processed by a signal processor 34 to generate a reproduction signal. The output tracking and focusing signals are supplied to a voice coil driver 36, and a voice coil 38 is energized. The objective lens 8 is driven by the voice coil 38, and is kept in the in-focus and intrack states.

Figure 2:
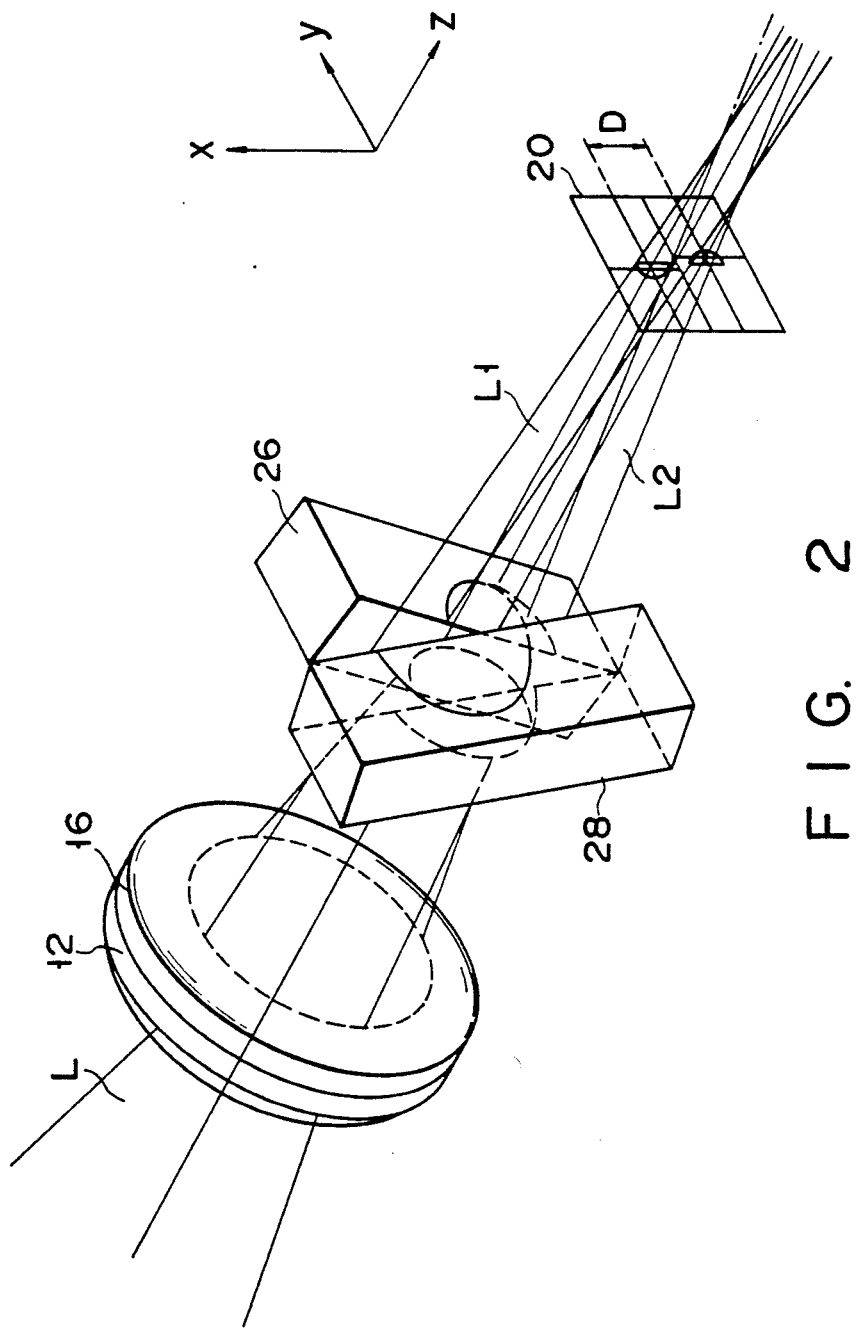
FIG. 2 is a perspective view of the focusing detection optical system associated with the twin plates method shown in FIG. 1.

The function of first and second optical refracting members 26 and 28 will be described in detail with reference to FIG. 2. First and second optical refracting members 26 and 28 are made of, e.g., glass plates and have a parallel plate-like shape preferably having the same thickness. Each parallel plate has side surfaces parallel to the x-z plane. Refracting members 26 and 28 are arranged such that their opposing side surfaces contact the optical axes of the incident beams. Furthermore, the incident and output surfaces of first and second plates 26 and 28 define predetermined angles with a plane perpendicular to the optical axis, and more preferably are directed in different directions to define the same angle with the optical axis. As a result, the incident light beam is split by a line extending in the x-direction perpendicular to a direction in which the shadow of a groove in the optical disk is projected. When the incident and output surfaces of first and second parallel plates 26 and 28 are inclined, the light beam passing through plates 26 and 28 is split into first and second light beams L1 and L2 having first and second axes that are substantially parallel to the optical axis of incident light beam L and have predetermined distance D therebetween, and beams L1 and L2 radiate optical detector 20. Distance D between beams L1 and L2 depends on refractive index n of plates 26 and 28 and angle $\theta$ defined by plates 18 and 19 and thickness of plate t. This relationship is shown in FIGS. 3A and 3B.

Figure 3A:
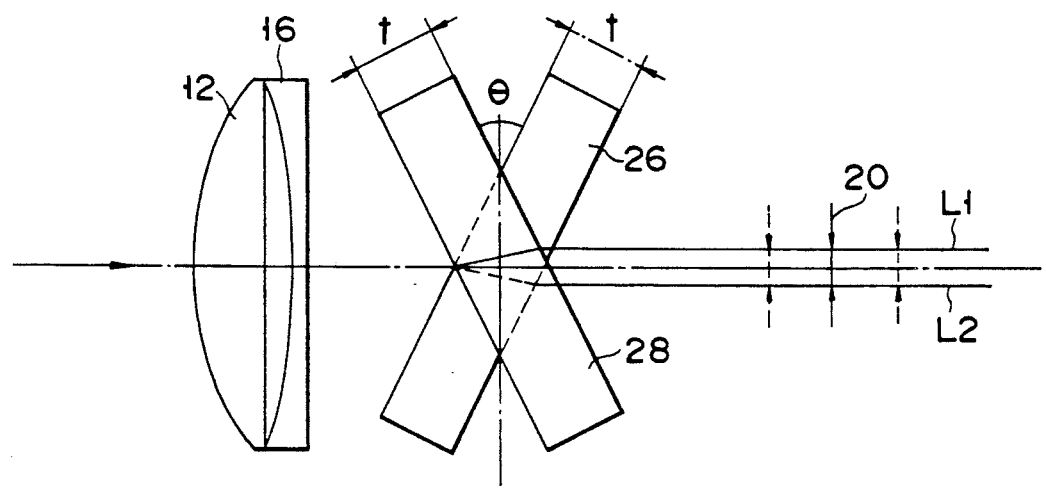
FIGS. 3A and 3B are side views for explaining the optical system shown in FIG. 2.

FIG. 3A shows the optical paths of first and second light beams L1 and L2 emerged from first and second parallel plates 26 and 28 to be substantially parallel to the optical axis of incident light beam L. Referring to FIG. 3A, plates 26 and 28 are made of the same material having the same thickness. Displacement D between the optical axes of light beams L1 and L2 can be approximated as $D=(1-1/n)\theta t$, where t is the thickness of plates 26 and 28, n is the refractive index of plates 26 and 28, and $\theta$ is an angle defined by plates 26 and 28. If angle $\theta$ is comparatively small, displacement D of the optical axes of the light beams does not depend on the mutual distance among focusing lenses 12 and 16, parallel plates 26 and 28, and optical detector 20.

Figure 3B:
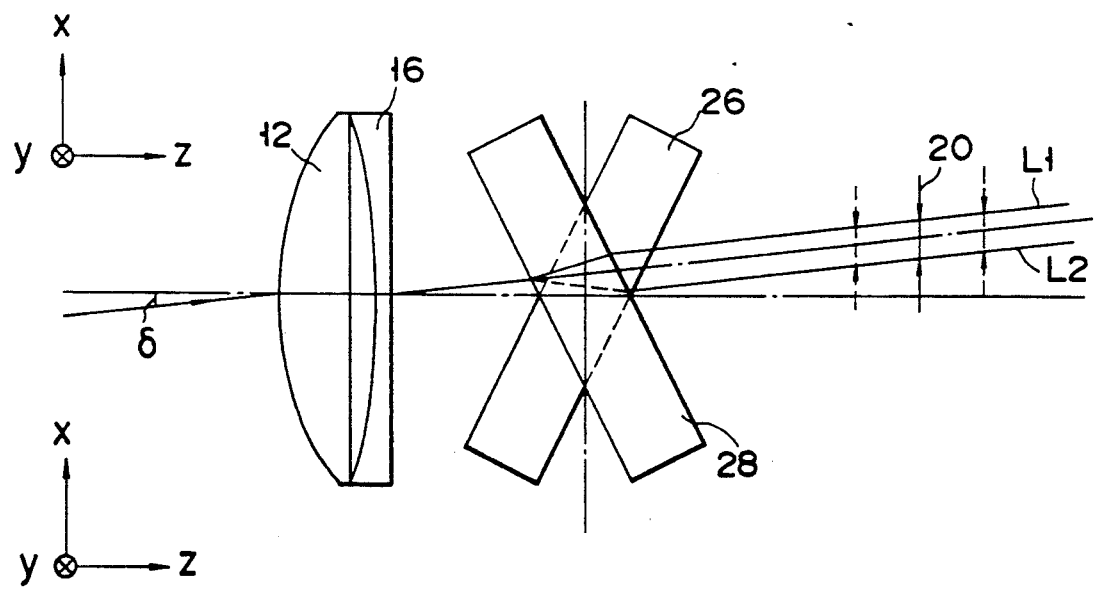

FIG. 3B shows a displacement of the optical axes of two split light beams L1 and L2 generated when a light beam is erroneously incident on two glass plates 26 and 28 at angle $\delta$ with respect to the optical axis. When a light beam is incident an angle $\delta$ with respect to the optical axis, the displacement generated by plate 28 is increased by $(1-1/n)\delta t$, and that generated by plate 26 is decreased by $(1-1/n)\delta t$. As a result, displacement D of the optical axes of the two light beams does not depend on angle $\delta$ when angle $\theta$ defined by the two glass plates is comparatively small. In this manner, distance D between the light beams emerged from parallel plates 26 and 28 is maintained at a substantially constant value without being influenced by the displacement of the respective optical components in the direction of the optical axis. Thus, a focusing state detecting apparatus which can be easily assembled and adjusted is provided.

FIGS. 4A to 4C show optical detector 20 having 4-segment photosensitive regions used for the apparatus for detecting a focusing state of a light beam.

Figure 5:
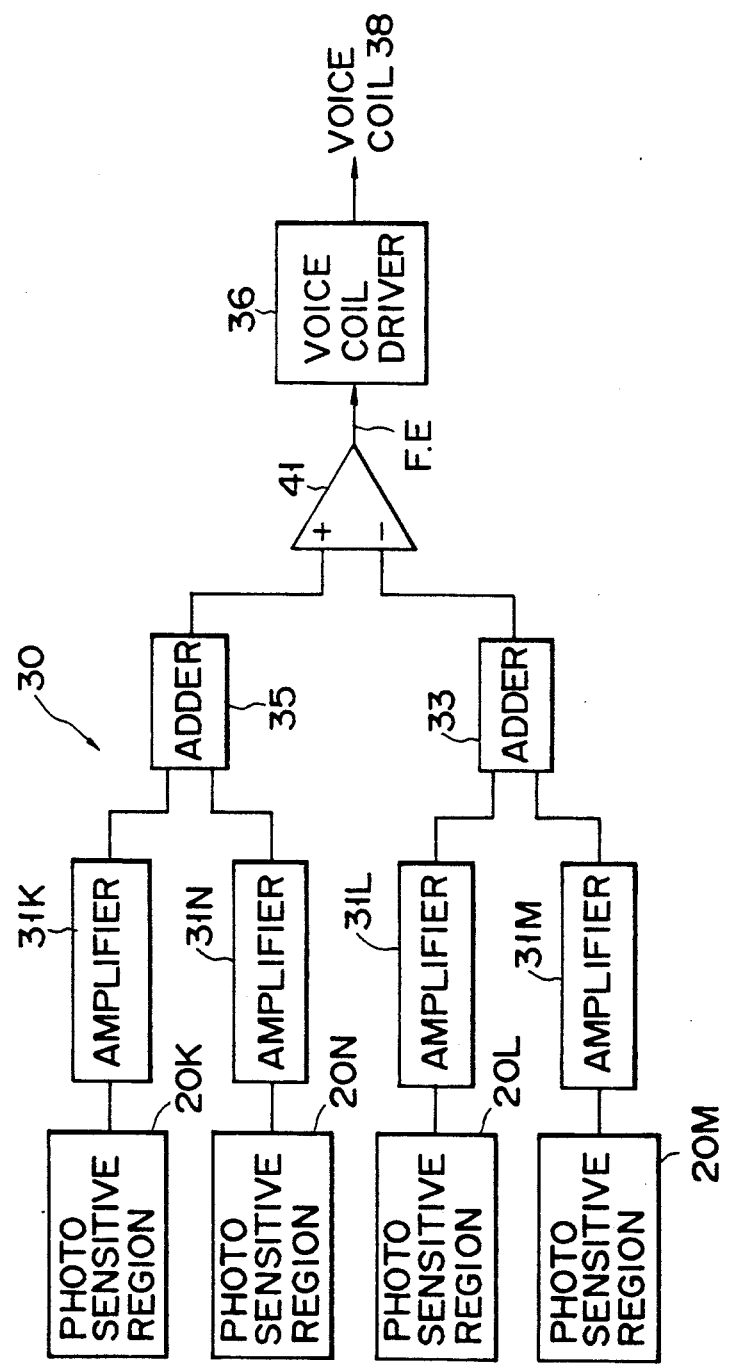
FIG. 5 is a block diagram showing a detailed arrangement of a focusing signal generator shown in FIG. 1.

Optical detector 20 shown in FIG. 5 consists of four segment regions, i.e., a first group of photo sensitive regions 20K and 20M for converting an incident beam passing through optical refracting member 26 into an electrical signal and a second group of photo sensitive regions 20L and 20N for converting an incident beam passing through optical refracting member 28 into an electrical signal.

When objective lens 8 is in an in-focus state with the optical disk, images as shown in FIG. 4B are projected on optical detector 20. The light beam passing through optical refracting member 26 is projected on the first group of photosensitive regions 20K and 20M to form a semicircular image, and the light beam passing through optical refracting member 28 is projected on the second group of photo sensitive regions 20L and 20N to form a semicircular image in the opposite direction. X-direction separation lines 21 and 22 as photo insensitive regions are defined at substantially the central portions so as to project the respective semicircular images on the right and left photo sensitive regions with the same intensity. In other words, in the infocus state, separation lines 21 and 22 are set to satisfy $F.E=\{(①+④)-(②+③)\}=0$ where ① to ④ are the outputs from photo sensitive regions 20K to 20N, respectively.

When objective lens 8 is removed from the in-focus position with respect to the optical disk, the two vertical semicircular images are smaller than those in the in-focus state, and the output is $F.E>0$. On the contrary, when objective lens 8 is moved to approach the in-focus position with respect to the optical disk, the two vertical semicircular images are larger than those in the in-focus state, and the output is $F.E<0$.

The output signal from optical detector 20 is processed by the focusing signal generator 30 shown in FIG. 5.

The outputs from photo sensitive regions 20K to 20N are respectively supplied to amplifiers 31K to 31N. The signals amplified by amplifiers 31K and 31N are supplied to adder 32. The signals amplified by amplifiers 31L and 31M are supplied to adder 33. The sum signal obtained by adder 35 is supplied to the inverting input terminal of differential amplifier 41, and the sum signal obtained by adder 33 is supplied to the noninverting input terminal of differential amplifier 41. Differential amplifier 41 as the focusing signal generator compares the sum signal of the detection signals from regions 20K and 20N with the sum signal of the detection signals from regions 20L and 20M. In accordance with the obtained error signal, i.e., a focusing error detection signal, a current is supplied to a coil 38 for driving objective lens 8 in a direction substantially perpendicular to the recording surface of optical disk 1, and objective lens 8 is driven, thereby correcting the focusing error.

Figure 6:
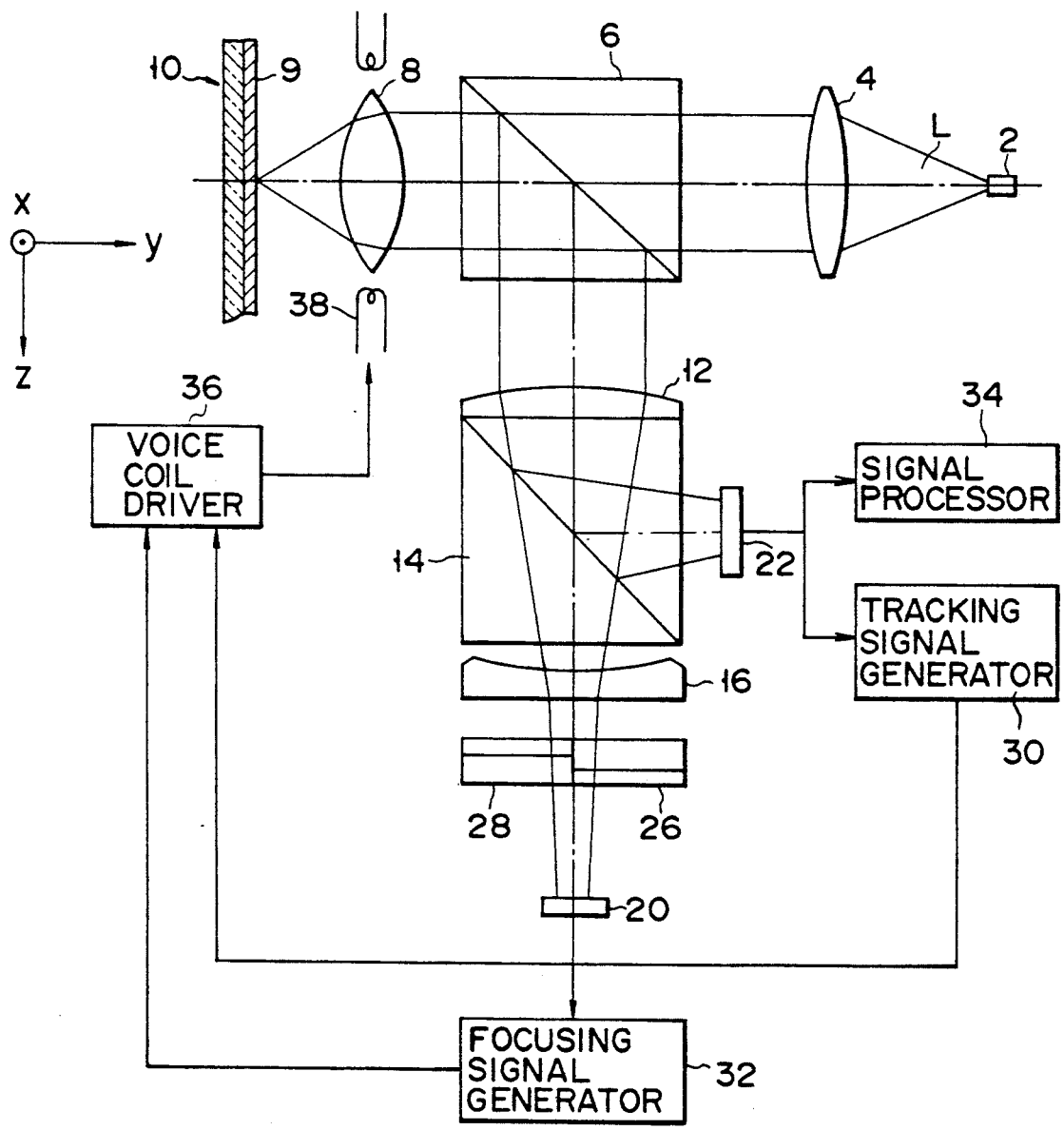
FIG. 6 shows an optical system according to a modification of FIG. 1.

The optical system shown in FIG. 1 can be modified, as shown in FIG. 6. More specifically, as shown in FIG. 6, a light beam reflected by the half prism 14 may be detected by the detector 22, and may be converted into a tracking signal. The light beam passing through the half prism may be detected by the detector 20, and may be converted into a focusing signal.

The detailed arrangement and its modification of the focusing detection optical system according to the twin plates method shown in FIGS. 1 and 6 are disclosed in U.S. Ser. No. 271,827, Ishika, filed Nov. 16, 1988 (corresponding EPC application No. 88119021.9, filed Nov. 15, 1988).

A focusing detection optical system which employs an astigmatism method will be described hereinafter with reference to FIGS. 7A and 7B.

Figure 7A:
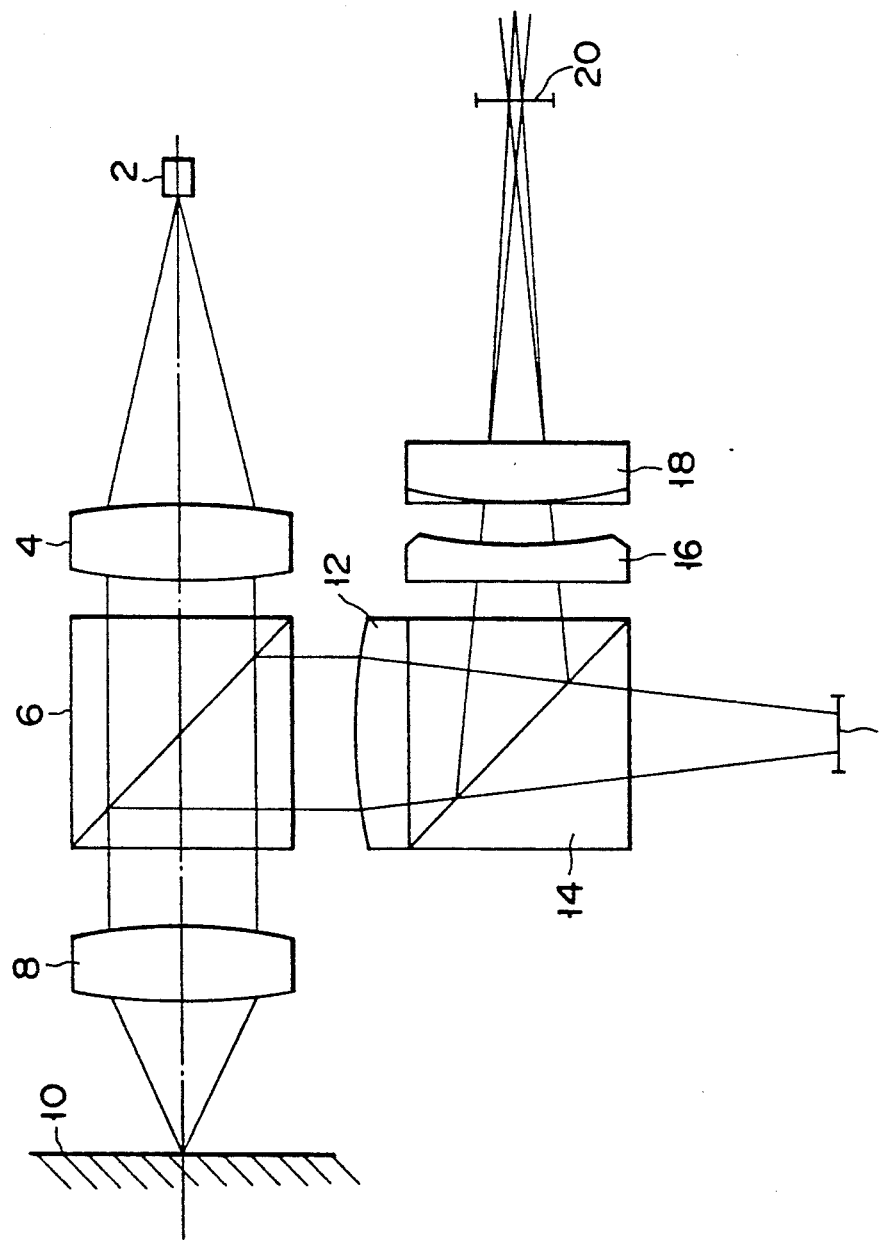

The same parts in FIGS. 7A and 7B are denoted by the same reference numerals as in FIGS. 1 and 6, and a description thereof will be omitted. Referring to FIGS. 7A and 7B, a cylindrical lens 18 is arranged between a concave lens 16 and a half prism 14 in place of the twin plates 26 and 28 shown in FIG. 1. In this optical system shown in FIGS. 7A and 7B, the convex and concave lenses 12 and 16 are assembled to constitute a focusing detection optical system, as in the optical system shown in FIGS. 1 and 6. Thus, this focusing detection optical system similarly has a larger focal length. Since a tracking guide detection optical is constituted by only the convex lens 12, this tracking guide detection optical system similarly has a small focal length. Furthermore, in the embodiment according to the present invention, the convex lens 12 is made of glass having a relatively high refractive index, e.g., 1.7 or more, to obtain a high lens power, and the concave lens 16 is made of glass having a relatively low refractive index, e.g., 1.5 or less, to obtain a low lens power.

In the optical system shown in FIGS. 7A and 7B, a tracking signal is generated from a tracking guide detection detector 22 on the basis of the principle of the push-pull method in the same manner as in the optical system shown in FIGS. 1 and 6. In addition, focusing detection is performed as follows. When an objective lens 8 is kept in an in-focus state, a parallel light beam is incident on the convex lens 12, and is converged by the convex lens 12. A beam spot is formed on a detector 20. As is known well, this beam spot is formed to have a circular shape in an in-focus state, and is formed to have an oval shape in a defocus state. A detection signal corresponding to the change in shape is generated by the photodetector 20, and this detection signal is processed by a circuit 32. The processed signal is output as a focusing signal. The output tracking and focusing signals are supplied to a voice coil 38, and the objective lens 8 is driven by the voice coil 38, thus keeping the lens 8 in the in-focus and in-track state.

A focusing detection optical system which employs a knife-edge method according to the present invention will be described hereinafter with reference to FIGS. 8A and 8B.

Figure 8A:
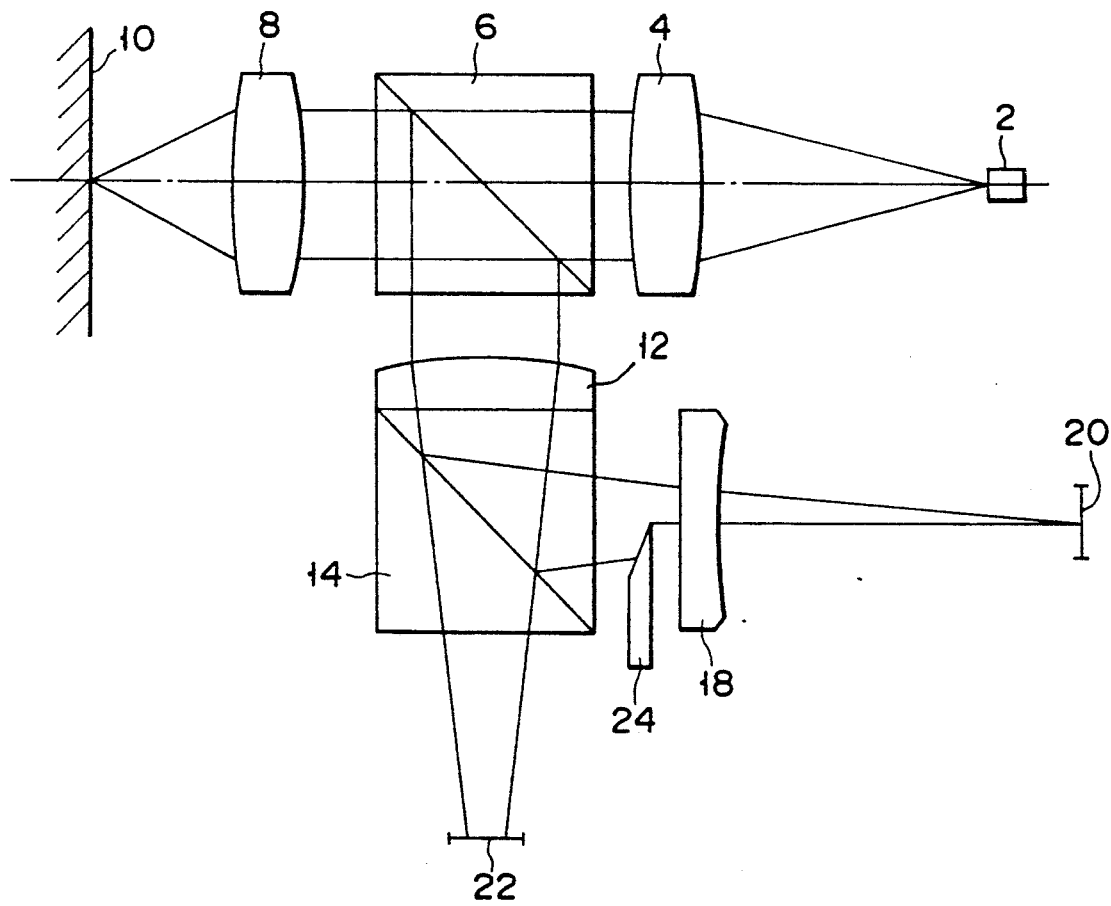
Figure 8B:
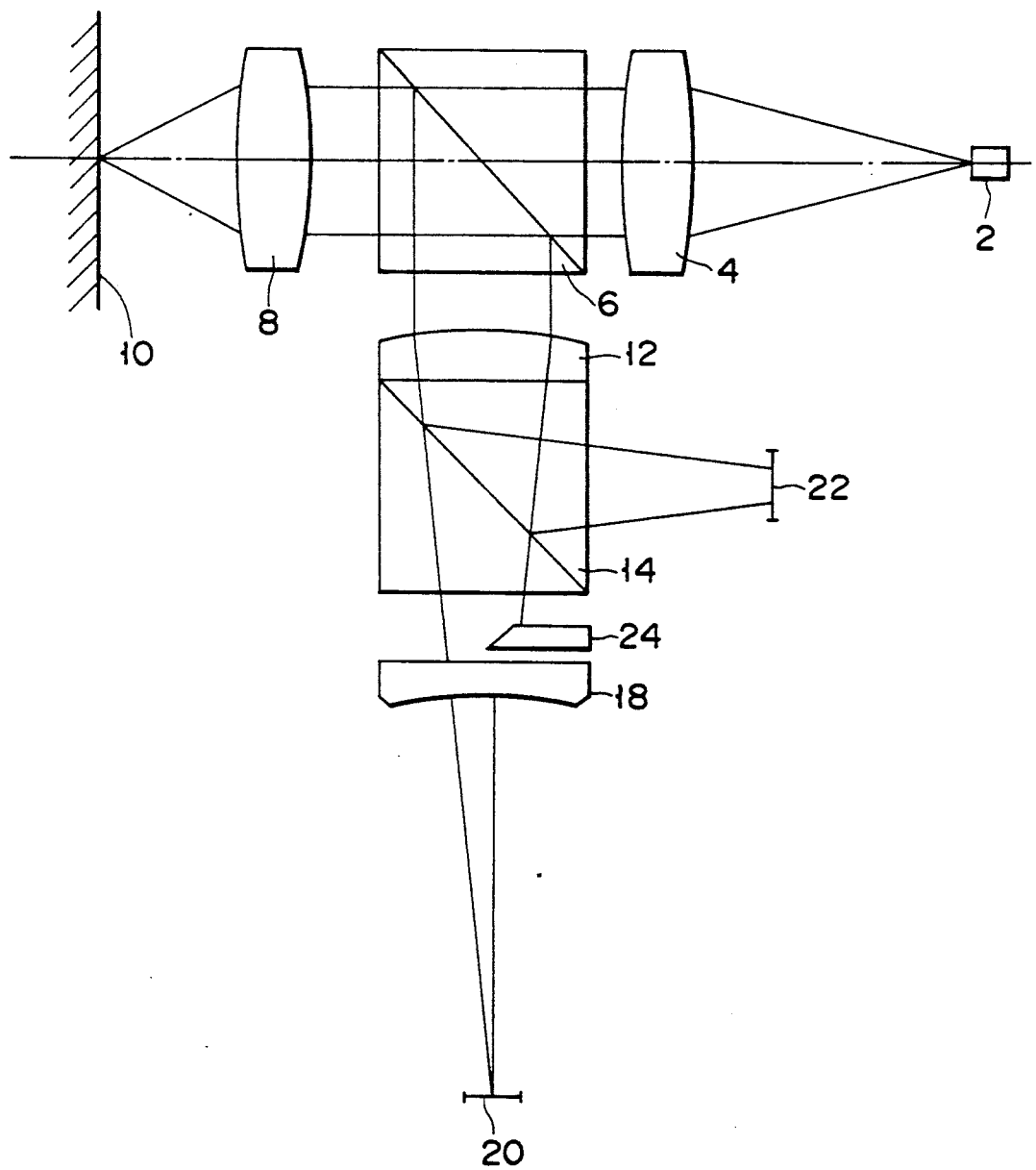

Referring to FIGS. 8A and 8B, a knife edge 24 is arranged between the concave lens 16 and the half prism 14 in place of the cylindrical lens 18 shown in FIGS. 7A and 7B. In this optical system shown in FIGS. 8A and 8B, the convex and concave lenses 12 and 16 are combined to constitute a focusing detection optical system, as in the optical system shown in FIGS. 7A and 7B. Thus, this focusing detection optical system similarly has a large focal length. Since the tracking guide detection optical system is constituted by only the convex lens 12, this tracking guide detection optical system similarly has a small focal length. Furthermore, in the embodiment according to the present invention, the convex lens 12 is made of glass having a relatively large refractive index, e.g., 1.7 or more, to obtain a high lens power, and the concave lens 16 is made of glass having a relatively small refractive index, e.g., 1.5 or less, to obtain a low lens power.

In the optical system shown in FIGS. 8A and 8B, a tracking signal is generated from the tracking guide detection detector 22 on the basis of the principle of the push-pull method in the same manner as in the optical system shown in FIGS. 7A and 7B. In addition, focusing detection is performed as follows. When the objective lens 8 is kept in an in-focus state, a parallel light beam is incident on the convex lens 12, and is converged by the convex lens 12. The focusing light beam partially interrupted by the knife edge is slightly diverged by the concave lens 16, and is projected on substantially the central portion of the focusing photodetector 20. In contrast to this, when the objective lens 8 is kept in a defocus state, the diverged or converged light beam is incident on the convex lens 12, and hence the convergence state of the light beam converged by the convex lens is changed. A part of the converged light beam is spatially and asymmetrically extracted by the knife edge 24. As a result, the focusing detection light beam is projected toward a region deviated from the center of the focusing light beam. In the knife-edge method, a detection signal corresponding to the change in optical projection region of this light beam is processed by the circuit 32, and is supplied to the voice coil 38 as a focusing signal. The objective lens 8 is kept in an in-focus state.

In the embodiment shown in FIGS. 7A, 7B, 8A, and 8B since the focusing detection optical system has a large focal length, a focusing state of the objective lens 8 can be detected with a high detection sensitivity. In addition, since the convex lens 12 is made of glass having a relatively large refractive index, and has a small focal length, a distance between the half prism 14 and the tracking detector 22 can be decreased, i.e., an optical path of the tracking light beam can be shortened, and the size of the optical head can be decreased. Furthermore, since the convex lens 12 is made of glass having a relatively large refractive index to obtain a high lens power, a large curvature is not required. Therefore, the aberration applied to the light beam passing through the convex lens 12 can be minimized. Since the concave lens 16 is made of glass having a relatively small refractive index, the curvature of the concave lens 16 is set to be relatively large when the concave lens obtains a proper lens power. Even if an aberration is applied from the convex lens 12 to the light beam, therefore, this aberration can be sufficiently removed by the concave lens 16. In other words, when the convex, concave, and cylindrical lenses 12, 16, and 18 are appropriately arranged, the aberration of the light beam can be suppressed not to adversely affect focusing characteristics. For example, an RMS wave aberration can be suppressed to be $1/14\lambda$ or less.

In addition, the optical system, wherein the focusing detection light beam is transmitted through the half prism 14, and is detected, and the tracking detection light beam is reflected by the half prism and is detected, is employed in FIGS. 6, 7B, and 8B. Furthermore, when a distance between the half prism 14 and the tracking detector 22 is shortened, the following effect can be achieved.

Figure 9:
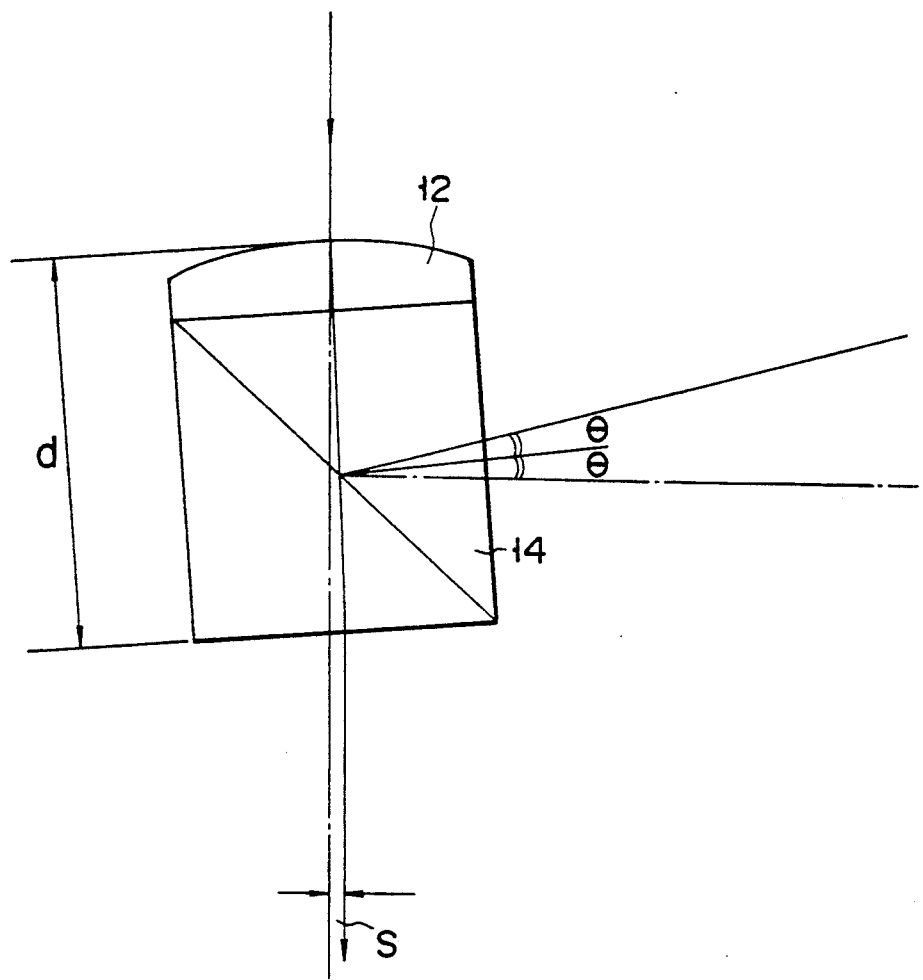
FIG. 9 is a schematic view for explaining displacement of a half prism shown in FIGS. 6, 7B, and 8B.

More specifically, as shown in FIG. 9, if the half prism 14 is misaligned, and is inclined by an angle $\theta$ with respect to an optical axis of the optical system, the tracking detection light beam serving as a reflected light beam is inclined by an angle 2$\theta$ and is reflected, and the focusing detection light beam serving as a transmitted light beam is parallelly displaced by $s=(1-1/n)\theta \cdot d$ (where d is the length of a beam splitter, and n is a refractive index of the half prism), and is output from the half prism 14. In the conventional optical head, the distance between the half prism 14 and the tracking detection photodetector 22 falls within the range of 10 mm to 30 mm. Even if the half prism is misaligned by only an angle $\theta=10°$, the tracking detection optical beam is displaced by 30 $\mu$m to 90 $\mu$m on the photodetector 22, and is incident on the photodetector 22. In practice, since a magnification of the optical system must be taken into consideration, this displacement is further increased. Assuming that the refractive index of the half prism 14 is set to satisfy n=1.5, and the size of the half prism 14 is set to satisfy d=7 mm, the focusing detection light beam is displaced by about 7 $\mu$m to 200 $\mu$m on the focusing photodetector 20, and is incident on the photodetector 20. This value corresponds to $\frac{1}{3}$ the displacement of the tracking detection light beam. In general, the displacement on the photodetector 20 and 22 is about 5 $\mu$m in normal focusing, and is about 5% of a beam size in tracking. For example, when the beam size is 500 $\mu$m, 25 $\mu$m is an allowance limit. The allowance range associated with tracking is larger than that associated with focusing.

As is apparent from the above consideration, according to the optical system shown in FIGS. 6, 7B, and 8B, a distance between the half prism 14 and the tracking guide photodetector 22 can be sufficiently decreased. Slight misalignment is negligible. In addition, as is also apparent from the above consideration, if misalignment occurs in the half prism 14, its influence on the transmitted light beam is larger than that on the reflected light beam. In the optical system shown in FIGS. 6, 7B, and 8B, the focusing detection light beam having a narrow allowance range passes through the half prism 14 as a transmitted light beam, and is supplied to the detector 20, and the tracking than that in focusing detection is reflected by the half prism 14 as a reflected light, and is supplied to the photodetector 22. Thus, according to the optical system of the above embodiments, both a focusing and tracking state can be accurately detected within an allowance range.

As described above, according to the present invention, there is provided an optical information processing system including an optical head, having a compact optical system, for accurately detecting both focusing and tracking states.

What is claimed is:

1. A system comprising:
    converging means for converging a light beam onto a recording medium having a track;
    a convex lens for converging the light beam from the recording medium, said convex lens having a refractive index;
    dividing means for dividing the converged light beam from the convex lens into a reflected light beam and transmitted light beam;
    means for causing the converging means to move the light beam converged on the recording medium to trace the track in response to one of the reflected and transmitted light beams;
    a concave lens for applying a divergent power to the other of the reflected and transmitted light beams, said concave lens having a refractive index smaller than the refractive index of said convex lens; and
    means for maintaining the converging means in an focusing state in which the light beam from the converging means is focused on the recording medium, in response to the other of the reflected and transmitted beams from said concave lens.

2. The system according to claim 1, wherein the maintaining means includes:
    means for splitting the other light beam into a first segment beam having a first optical axis and a second segment beam having a second optical axis substantially parallel to the first optical axis;
    means for detecting the first and second segment beams to generate a focusing signal; and
    means for moving the converging means along its optical axis in response to the focusing signal.

3. The system according to claim 2, wherein the splitting means includes first and second refracting plates, each inclined at a different predetermined angle to the optical axis of the other light beam.

4. The system according to claim 1, wherein the maintaining means includes:
    means for applying an astigmatism to the other light beam;
    means for detecting the light beam having the astigmatism to generate a focusing signal; and
    means for moving the converging means along its optical axis in response to the focusing signal.

5. The system according to claim 4, wherein the applying means includes a cylindrical lens.

6. The system according to claim 1, wherein the maintaining means includes:
    means for extracting a part of the other light beam;
    means for detecting the part of the other light beam to generate a focusing signal; and
    means for moving the converging means along its optical axis in response to the focusing signal.

7. The system according to claim 6, wherein the extracting means includes a knife edge.

8. The system according to claim 1, wherein the dividing means includes a half prism having a half transmission and reflection surface.

9. The system according to claim 1, further comprising:
    a light source for emitting the light beam; and
    means for transferring the light beam from the light source to the converging means and the light beam from the recording medium to the dividing means.

10. A system comprising:
    converging means for converging a light beam onto a recording medium having a track;
    a convex lens for converging the light beam from the recording medium, said convex lens having a refractive index;

dividing means for dividing the converged light beam from the convex lens into a reflected light beam and a transmitted light beam;

means for causing the converging means to move the light beam converged on the recording medium to trace the track in response to the reflected light beam;

a concave lens for applying a divergent power to the transmitted light beam, said concave lens having a refractive index smaller than the refractive index of said convex lens; and means for maintaining the converging means in an focusing state in which the light beam from the converging means is focused on the recording medium, in response to the transmitted light beam from said concave lens.

11. The system according to claim 10, wherein the maintaining means includes:

means for splitting the transmitted light beam into a first segment beam having a first optical axis and a second segment beam having a second optical axis substantially parallel to the first optical axis;

means for detecting the first and second segment beams to generate a focusing signal; and means for moving the converging means along its optical axis in response to the focusing signal.

12. The system according to claim 11, wherein the splitting means includes first and second refracting plates, each inclined at a different predetermined angle to the optical axis of the other light beam.

13. The system according to claim 11, wherein the maintaining means includes:

means for applying an astigmatism to the transmitted light beam;

means for detecting the transmitted light beam having the astigmatism to generate a focusing signal; and means for moving the converging means along its optical axis in response to the focusing signal.

14. The system according to claim 12, wherein the applying means includes a cylindrical lens.

15. The system according to claim 11, wherein the maintaining means includes:

means for extracting a part of the transmitted light beam;

means for detecting the part of the transmitted light beam to generate a focusing signal; and means for moving the converging means along its optical axis in response to the focusing signal.

16. The system according to claim 14, wherein the extracting means includes a knife edge.

17. The system according to claim 11, wherein the dividing means includes a half prism having a half transmission and reflection surface.

18. The system according to claim 11, further comprising:

a light source for emitting the light beam; and means for transferring the light beam from the light source to the converging means and the light beam from the recording medium to the dividing means.

* * * * *